(12) United States Patent
Kitamura

(10) Patent No.: US 9,081,723 B2
(45) Date of Patent: Jul. 14, 2015

(54) DATA PROCESSING DEVICE

(71) Applicant: The Bank of Tokyo—Mitsubishi UFJ, Ltd., Chiyoda-ku, Tokyo (JP)

(72) Inventor: Takashi Kitamura, Tokyo (JP)

(73) Assignee: THE BANK OF TOKYO—MITSUBISHI UFJ. LTD., Tokyo (JP)

( * ) Notice: Subject to any disclaimer, the term of this patent is extended or adjusted under 35 U.S.C. 154(b) by 211 days.

(21) Appl. No.: 13/721,363

(22) Filed: Dec. 20, 2012

(65) Prior Publication Data

US 2013/0166950 A1    Jun. 27, 2013

(30) Foreign Application Priority Data

Dec. 27, 2011   (JP) .................... 2011-286406

(51) Int. Cl.
   *G06F 11/00*   (2006.01)
   *G06F 11/14*   (2006.01)

(52) U.S. Cl.
   CPC ........ *G06F 11/1402* (2013.01); *G06F 11/1474* (2013.01)

(58) Field of Classification Search
   CPC .. G06F 11/1402; G06F 11/14; G06F 11/1474
   USPC .............. 714/15, 2, 10, 13, 16, 20, 38.1, 47.1
   See application file for complete search history.

(56) References Cited

U.S. PATENT DOCUMENTS

| | | | |
|---|---|---|---|
| 5,533,191 A | 7/1996 | Nakano | |
| 7,620,842 B2 * | 11/2009 | Fung et al. | 714/4.11 |
| 7,711,986 B2 * | 5/2010 | Ozawa et al. | 714/20 |
| 8,078,911 B2 * | 12/2011 | Taylor et al. | 714/18 |
| 2006/0048000 A1 | 3/2006 | Muramatsu et al. | |
| 2008/0126833 A1 * | 5/2008 | Callaway et al. | 714/4 |

FOREIGN PATENT DOCUMENTS

| | | |
|---|---|---|
| JP | 2-06636 A | 3/1990 |
| JP | H05-314075 A | 11/1993 |
| JP | 10-198584 A | 7/1998 |
| JP | 2006-065440 A | 3/2006 |
| JP | 2007-018165 A | 1/2007 |
| JP | 2011-70504 A | 4/2011 |

OTHER PUBLICATIONS

Office Action dated Apr. 28, 2015 regarding a counterpart Japanese patent application No. 2011-286406.

* cited by examiner

*Primary Examiner* — Joseph D Manoskey
(74) *Attorney, Agent, or Firm* — Lowe Hauptman & Ham, LLP

(57) ABSTRACT

A data processing device 10 receives a process request from an external interface 20 of a client terminal etc., carries out the transaction request with respect to a message according to the process request and passes to an API which forms the interface of various types of program carried out in the server 30. The data processing device 10 includes a process (n) which carries out transaction processing with respect to a message with a trade category [n], and a backup process (n) which carries out transaction processing with respect to a message in the case where the transaction processing carried out by the process (n) fails. In addition, the data processing device 10 includes an error process part 123 which isolates the cause of a failure according to a result of a process by the backup process (n).

14 Claims, 14 Drawing Sheets

FIG.2

| trading name(message) | trade category | status |
|---|---|---|
| A(trader name, trading amount, date, ···) | 1 | not processing |
| B(trader name, trading amount, date, ···) | 9 | not processing |
| C(trader name, trading amount, date, ···) | 9 | not processing |
| D(trader name, trading amount, date, ···) | 2 | not processing |
| ⋮ | ⋮ | ⋮ |

FIG.6

| trading name(message) | trade category | status |
|---|---|---|
| A(trader name, trading amount, date, ···) | 1 | completed normally |
| B(trader name, trading amount, date, ···) | 9 | not processing |
| C(trader name, trading amount, date, ···) | 9 | not processing |
| D(trader name, trading amount, date, ···) | 2 | completed normally |
| ⋮ | ⋮ | ⋮ |

FIG.7

| trading name(message) | trade category | status |
|---|---|---|
| A(trader name, trading amount, date, ···) | 1 | completed normally |
| B(trader name, trading amount, date, ···) | 9 | warning completion |
| C(trader name, trading amount, date, ···) | 9 | not processing |
| D(trader name, trading amount, date, ···) | 2 | completed normally |
| ⋮ | ⋮ | ⋮ |

FIG.8

| trading name(message) | trade category | status |
|---|---|---|
| A(trader name, trading amount, date, ···) | 1 | completed normally |
| B(trader name, trading amount, date, ···) | 9 | error |
| C(trader name, trading amount, date, ···) | 9 | completed normally |
| D(trader name, trading amount, date, ···) | 2 | completed normally |
| ⋮ | ⋮ | ⋮ |

FIG.9

| trading name(message) | trade category | status |
|---|---|---|
| A(trader name, trading amount, date, ···) | 1 | completed normally |
| B(trader name, trading amount, date, ···) | 9 | completed normally |
| C(trader name, trading amount, date, ···) | 9 | warning completion |
| D(trader name, trading amount, date, ···) | 2 | completed normally |
| ⋮ | ⋮ | ⋮ |

FIG.10

| trading name(message) | trade category | status |
|---|---|---|
| A(trader name, trading amount, date, ···) | 1 | completed normally |
| B(trader name, trading amount, date, ···) | 9 | completed normally |
| C(trader name, trading amount, date, ···) | 9 | completed normally |
| D(trader name, trading amount, date, ···) | 2 | completed normally |
| ⋮ | ⋮ | ⋮ |

FIG.14

| trading name(message) | status |
|---|---|
| A(trader name, trading amount, date, ···) | not processing |
| B(trader name, trading amount, date, ···) | not processing |
| C(trader name, trading amount, date, ···) | not processing |
| D(trader name, trading amount, date, ···) | not processing |
| ⋮ | ⋮ |

| message identifier | trading contents | trade category |
|---|---|---|
| ZA | trader name(a), trading amount(a), date(a), ··· | 1 |
| ZB | trader name(b), trading amount(b), date(b), ··· | 9 |
| ZC | trader name(c), trading amount(c), date(c), ··· | 9 |
| ZD | trader name(d), trading amount(d), date(d), ··· | 2 |
| ⋮ | ⋮ | ⋮ |

(b)

| message identifier | status |
|---|---|
| ZA | not processing |
| ZB | not processing |
| ZC | not processing |
| ZD | not processing |
| ⋮ | ⋮ |

DATA PROCESSING DEVICE

CROSS-REFERENCE TO RELATED APPLICATIONS

This application is based upon and claims the benefit of priority from the prior Japanese Patent Application No. 2011-286406, filed on Dec. 27, 2011; the entire contents of which are incorporated herein by reference.

FIELD

The present invention is related to a technology for judging the cause of a failure. In particular, the present invention is related to a data processing device for judging the cause of a failure during transaction processing.

BACKGROUND

A device for managing transaction processing is generally used as a data processing device used in financial trading in order to carry out many processing requests while efficiently maintaining consistency. This type of data processing device includes a process for carrying out transaction processing according to a request from a client and a transfer process to an Application Program Interface (API) according to the request. When a failure occurs when transaction processing is carried out the transaction processing fails. In this case, it is necessary to remove the failure so that the subsequent processes are not affected. For example, a technology is disclosed in Patent Document 1 (Japanese Laid Open Patent H10-198584), Patent Document 2 (Japanese Laid Open Patent 2011-70504) and Patent Document 3 (Japanese Laid Open Patent H2-66636) for removing a failure in the case where a failure occurs when an application program is executed or when a system is running.

The cause of a failure occurring in a process may be found not only due to operation defect of the process itself but sometimes in the message which is the object of the transaction processing included in a request from a client. However, the cause for a failure occurring can not be isolated in the technology described in the Patent Documents 1, 2 and 3.

The present invention aims to solve the above described situation by isolating the cause of a failure occurring in transaction processing.

SUMMARY

A data processing device is provided as one embodiment of the president invention including a table configured to correlate a message, a type of transaction processing to be processed with respect to the message and a process status of the message, a process configured to be allocated with the type of transaction processing carried out with respect to the message, to carry out the transaction processing corresponding to the message with respect to the message with the process status being not-processed by referring to the table, and to change the process status a first status in the case where the transaction processing is successful and to change the process status a second state in the case where the transaction processing fails, a backup process configured to carry out the transaction processing allocated to the process, to carry out the transaction processing corresponding to the message with respect to the message with the process status being the second status by referring to the table, and to change the process status to the first status in the case where the transaction processing is successful and to change the process status to a third state in the case where the transaction processing fails, and an error process part configured to judge that the process having the process status changed to the second status is an error process in the case where the process status is changed to the first status by the backup process, and to judge that the message corresponding to the process status is an error message in the case where the process status is changed to the third status by the backup process.

In addition, a data processing device comprising is provided as an embodiment of the present invention including a table configured to correlate a message, a type of transaction processing to be processed with respect to the message and a process status of the message, a process configured to be allocated with the type of transaction processing carried out with respect to the message, to carry out the transaction processing corresponding to the message with respect to the message with the process status being not-processed by referring to the table, and to change the process status a first status in the case where the transaction processing is successful and to change the process status to a second state in the case where the transaction processing fails, a backup process configured to instruct the process to carry out the transaction processing corresponding to the message having the process status changed to the second status, to change the process status to the first status in the case where the transaction processing is successful and to change the process status a third state in the case where the transaction processing fails, and an error process part configured to judge that the process having the process status changed to the second status is an error process in the case where the process status is changed to the first status by the backup process, and to judge that the message corresponding to the process status is an error message in the case where the process status is changed to the third status by the backup process.

In addition, a data processing device is provided as an embodiment of the present invention including a table configured to correlate a message and process status corresponding to the message, a process configured to be allocated with a type of transaction processing determined in advance carried out with respect to the message, to carry out the transaction processing with respect to the message with the process status being not-processed by referring to the table, and to change the process status a first status in the case where the transaction processing is successful and to change the process status to a second state in the case where the transaction processing fails, backup process configured to instruct the process to carry out the transaction processing with respect to the message having the process status changed to the second status, to change the process status to the first status in the case where the transaction processing is successful and to change the process status to a third state in the case where the transaction processing fails, and an error process part configured to judge that the process having the process status changed to the second status is an error process in the case where the process status is changed to the first status by the backup process, and to judge that the message corresponding to the process status is an error message in the case where the process status is changed to the third status by the backup process.

BRIEF DESCRIPTION OF DRAWINGS

FIG. 2 is a diagram for explaining a table in the first embodiment of the present invention;

FIG. 6 is a diagram for explaining a table before transaction processing in the first embodiment of the present invention;

FIG. 7 is a diagram for explaining a table in the case when transaction processing fails in the first embodiment of the present invention;

FIG. 8 is diagram for explaining a table in the case when transaction processing fails in a backup process in the first embodiment of the present invention;

FIG. 9 is a diagram for explaining a table in the case when transaction processing is successful in a backup process in the first embodiment of the present invention;

FIG. 10 is a diagram for explaining a table after transaction processing in a backup process continuing from FIG. 9;

FIG. 14 is a diagram for explaining a table in the third embodiment of the present invention;

FIG. 16 is a diagram of table in a fourth modified example of the present invention.

DESCRIPTION OF EMBODIMENTS

First Embodiment

Structure

Figure 1:
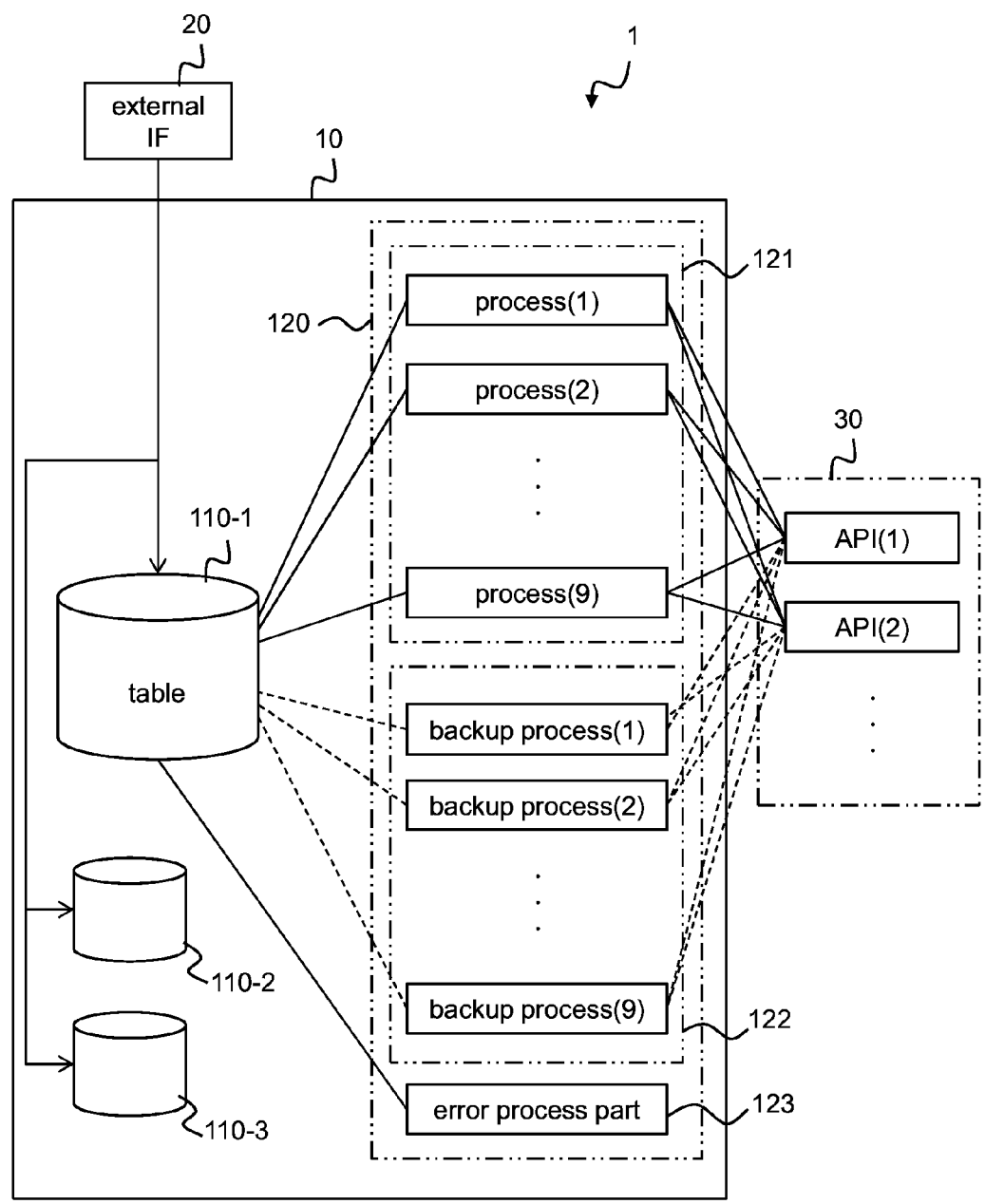
FIG. 1 is a diagram for explaining a data processing system in a first embodiment of the present invention.

FIG. 1 is a diagram for explaining a data processing system in the first embodiment of the present invention. The data processing system 1 related to the present embodiment includes a data processing device 10, an external interface 20 and a server 30.

The data processing device 10 of the present invention carries out transaction processing used in a trading system such as financial trading. The data processing device 10 receives a request (referred to below as a process request) for transaction processing from an external interface 20 such as a client. A message and the type of transaction to be processed are included in the transaction processing request.

When the data processing device 10 receives the process request in the form of a message from the external client 20, the transaction processing is carried out with respect to the message according to the process request and passes to an API which forms the interface of various types of program carried out in the server 30. API (1), API (2) . . . shown in FIG. 1 are API's or each type of program. Next, the structure of the data processing device 100 is explained.

The data processing device 10 includes a CPU 120. A function for carrying out transaction processing with respect to a process request from an external interface 20 and passing to an API is realized when the CPU 120 executes a program. In addition, the data processing device 110 includes a plurality of tables 110-1, 110-2, 110-3 (referred to as table 110 when each table is no distinguished). These tables 110 are stored in a memory part such as a hard disk or RAM and the contents are rewritten by control by the CPU 120. Furthermore, the table 110 may be comprised of three or more or three or less tables or just one table. These tables are used as a queue for temporarily holding a message corresponding to a process request.

FIG. 2 is a diagram for explaining the table 110 in the first embodiment of the present invention. In table 110, trading name ([A], [B], [C], . . . ), a trade category which shows the type of transaction processing ([1]~[9] in this example) and a status which shows the status of a process status in the message included in the contents of a message (trading contents such as [trader name], [trading amount] and [date (and time)] etc. in this example) are correlated. Furthermore, it is possible to store these in the table 110 so that the type of transaction processing and status are included in the contents of the message. Each time a process request is received from an external interface 20 the table 110 to be registered is determined by the CPU 120 according to the contents of a process request (for example, contents of a message). This determination is not required when there in only one table 110. Alternatively, a trade category is sometimes included in the message itself and in this case also this determination is not required. In addition, a correlation relationship between a trader name and trade category according to the message of the process request and type of transaction request is registered in the table 110 determined by the CPU 120. At this time, the status is registered as [not processed]. Furthermore, as is described below, a status changes to either [completed normally] (first state), [warning completion] (second state) and [error] (third state) depending on the result of transaction processing.

In FIG. 1, when the CPU 120 executes a program, each function of process part 121, backup process part 122 and an error process part 123 are realized.

The process part 121 is comprised of nine processes in the example. Transaction processing of each trade category [1]~[9] is allocated to each of the nine processes, a message is obtained from the table 110 and the allocated transaction processing is carried out. In the explanation below, a process for carrying out transaction processing in trade category [n] is referred to as process (n) (n=1, 2, . . . 9).

The backup process part 122 is comprised from nine backup processes corresponding to each process in the process part 121 in this example. Transaction processing of each trade category [1]~[9] is allocated to each of the nine backup processes and the allocated transaction processing is carried out with respect to the message. In the explanation below, a backup process for carrying out transaction processing in trade category [n] is referred to as backup process (n) (n=1, 2, . . . 9). When process (n) carries out transaction processing with respect to a message obtained from the table 110 and fails when an error is produced, the status of the message changes to the second status ([warning completion]). Then the backup process (n) carries out transaction processing again with respect to the message which has [warning completion] status.

The error process part 123 judges the cause of the failure of the transaction processing in the process part 121 according to the result of the transaction processing carried out by the backup process part 122. In addition, the error process part 123 carries out a process according to the judgment result. Next, a process (1) in the process part 121, a backup process (1) in the backup process part 122 and a process in the error process part 123 are explained in order. Furthermore, the process part 121 and backup process part 122 are explained using the case where the category of an allocated transaction processing is a trade category [1], that is, in the case where n=1 as an example. The same explanation is true in the case when n=2, 3, . . . 9.

Process (1)

Figure 3:
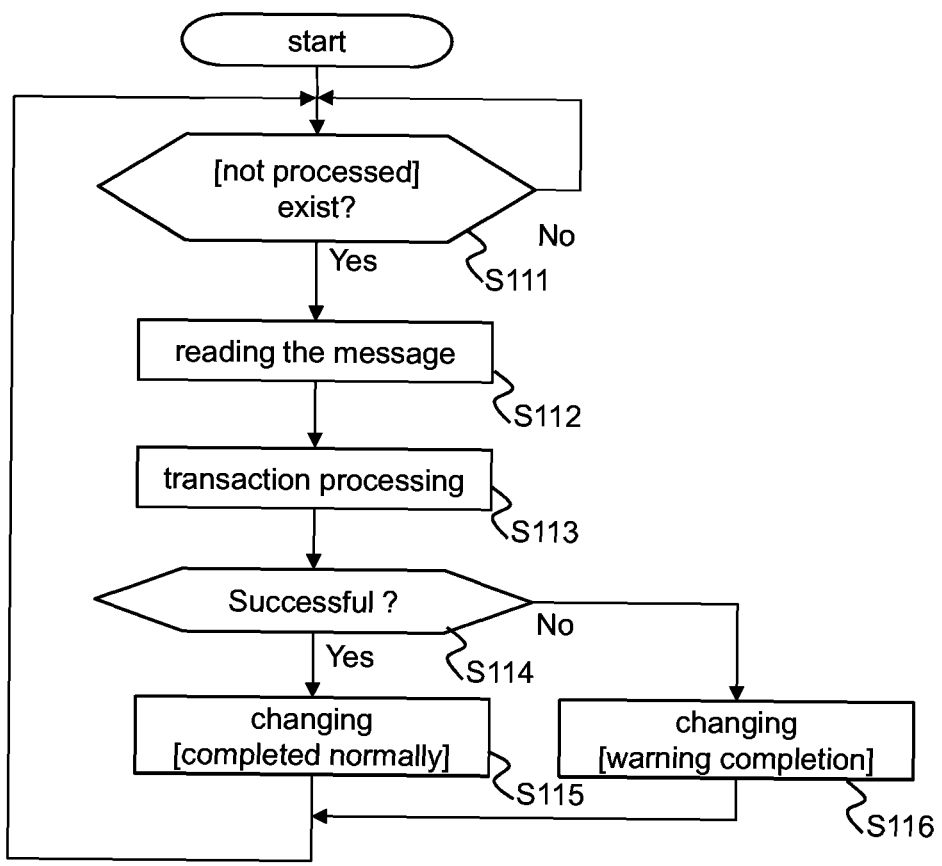
FIG. 3 is a flowchart for explaining transaction processing in the first embodiment of the present invention.

FIG. 3 is a flowchart for explaining the process (1) in the first embodiment of the present invention. Process (1) judges whether a message with the status [not processed] is included in the table 110 among the messages with the trade category [1] (step S111). In the case where there is no message with the status [not processed] (step S111: No), process (1) waits until a new message with the trade category [1] is registered in the table 110 by a process request from the external interface 20. In the case where a message with the status [not processed] is included in the table 110 (step S111: Yes), the process (1) reads that message (step S112). In the case where there are a plurality of messages with the trade category [1] and status [not processed], the message registered in the table with oldest date and time may be read for example.

The process (1) carries out transaction processing with the trade category [1] with respect to the read message and hands over to the API determined according to the process contents. In the case where the transaction processing which is carried out is successful (step S114: Yes), the process (1) changes the status [not processed] corresponding to the message which is read to [completed normally] (step S115) and the process returns to step Sill. In the case where the transaction processing which is carried out fails (step S114: No), the process (1) changes the status [not processed] corresponding to the message which is read to [warning completion] (step S116) and the process returns to step S111.

There are two types of cause for the failure of transaction processing in process (n). The first cause is in the case where there is an error in the message such as the message not appearing in a stipulated form. The second cause is in the case where transaction processing is not carried out by the process (n) according to the intended design. That is, the second cause is due to a failure during operation of the process (n) such as in the case of a defective product, in the case where a process is started in a different state to an originally intended stated due to the start timing of the process start or in the case where a memory leak occurs in a part used by the process. The same is also true for the backup process (n) explained below.

Furthermore, it is not essential that process (n) judge whether the cause of a transaction processing failure is a first cause or a second cause at the time when a status is changed to [warning completion]. This is because it is possible in the present embodiment to judge the cause of a failure based on the result of transaction processing in the backup process (n). Next, the backup process (n) is explained.

Backup Process (1)

Figure 4:
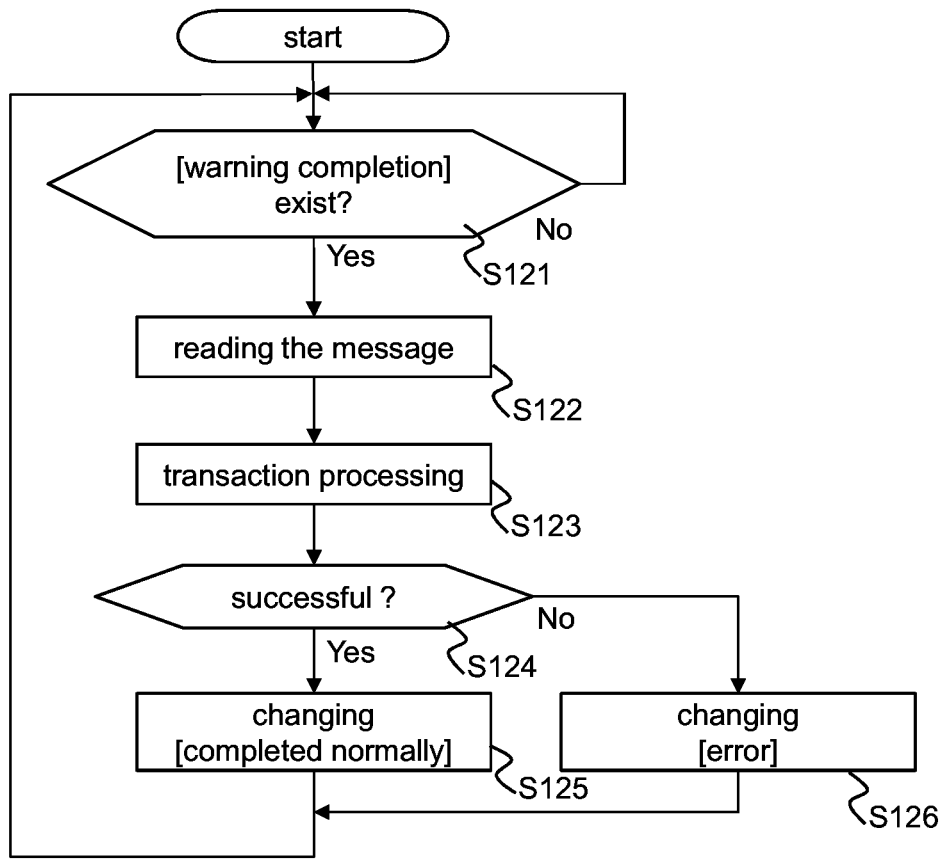
FIG. 4 is flowchart for explaining a backup process in the first embodiment of the present invention.

FIG. 4 is a flowchart for explaining a backup process (1) in the first embodiment of the present invention. The backup process (1) judges whether a message with the status [warning completion] is included in the table 110 among the messages with the trade category [n] (step S121). In the case where there is no message with the status [warning completion] (step S121: No), backup process (1) waits until the status is changed by the process (1). In the case where a message with the status [warning completion] is included in the table 110 (step S121: Yes), the backup process (1) reads that message (step S122). In the case where there are a plurality of messages with the status [warning completion], the message registered in the table with oldest date and time may be read for example.

The backup process (1) carries out transaction processing with the trade category [1] with respect to the read message and hands over to the API determined according to the process contents. In the case where the transaction processing which is carried out is successful (step S124: Yes), the backup process (1) changes the status [warning completion] corresponding to the message which is read to [completed normally] (step S125) and the process returns to step S121. In the case where the transaction processing which is carried out fails (step S124: No), the backup process (1) changes the status [warning completion] corresponding to the message which is read to [error] (step S126) and the process returns to step S121. Next, the error process part 123 is explained.

Error Process Part 123

Figure 5:
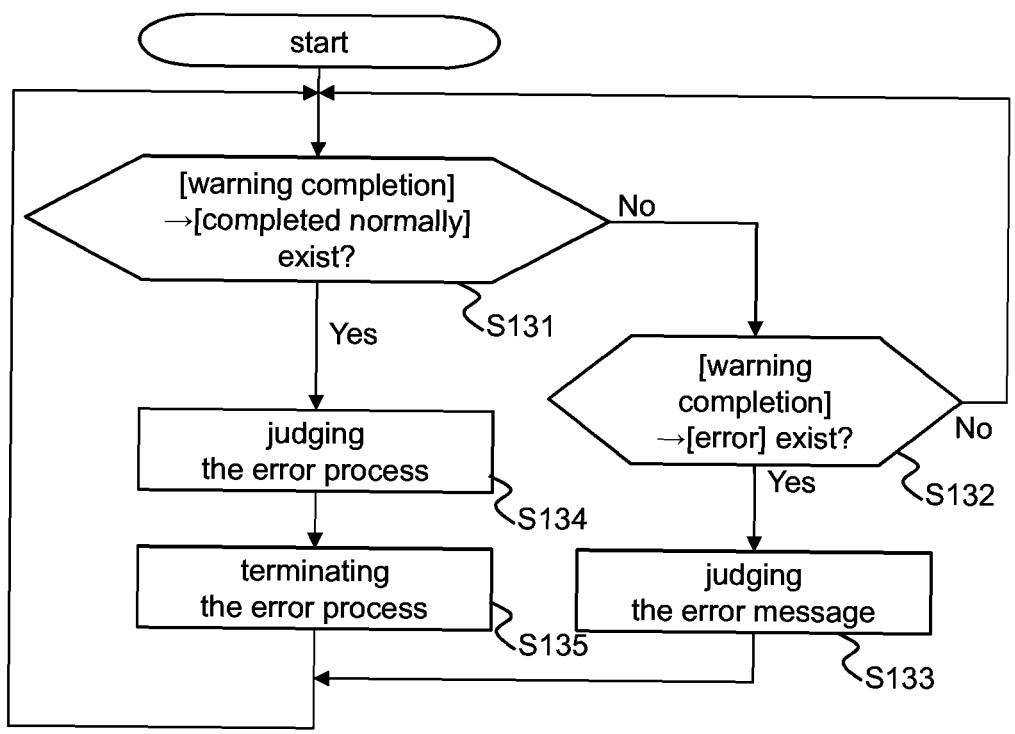
FIG. 5 is a flowchart for explaining for explaining the processes in an error process part in the first embodiment of the present invention.

FIG. 5 is a flowchart for explaining the error process part 123 in the first embodiment of the present invention. The error process part 123 waits until a status corresponding to any message in the table 110 changes from [warning completion] to [completed normally] or to [error] (step S131: No, step S132: No). In the case where the status changes from [warning completion] to [error] (step S132: Yes), the cause of a transaction processing failure is given as a first cause. That is, the error process part 123 judges that message as a message containing an error (referred to below as error message) and the process returns to step S131. The error process part 123 notifies the manager of the data processing device 10 of the judgment result and encourages the operator of the data processing device 10 to correct the message.

In this way, when transaction processing fails in the process (n) with respect to a message with the status [error], transaction processing within respect to the same message fails again in the process (n). It is generally difficult to assume that the cause for failure of the transaction processing described above occurs in both process (n) and the backup process (n) and in this case it is highly probable that the cause is an error message. Therefore, the error process part 123 judges a message with an [error] status as an error message.

However, in the case where the status changes from [warning completion] to [completed normally] (step S131: Yes), the error process part 123 judges the process (n) which changed the status of this message to [warning completion] as a process in which an error has occurred (referred to as error process below) (step S134). The error process part 123 notifies the manager of the data processing device 110 of the judgment result and may encourage a correction of the process (n) and a restart of the process etc.

In this way, transaction processing in the process (n) fails and transaction processing in the back up process (n) is successful with respect to a message with a status changed to [completed normally] via [warning completion]. Therefore, because there was no error in the message, the cause of a failure of transaction processing described above occurs in the process (n). Therefore, in the case where there is a message with a status which is changed from [warning completion] to [completed normally], the error process part 123 judges the process (n) in which the status of the message is changed to [warning completion] to be an error process.

Next, the error process 123 terminates the process (n) judged to be an error process (step S135) and the process returns to step S131. In this way, by terminating the process (n) judged to be an error process, unnecessary processes are not performed and it is possible to reduce resources. In this case, transaction processing may be carried out in the backup process (n) with respect to a message with the trade category [n] in which transaction processing is to be carried out by the process (n). That is, the error process part 123 instructs the backup process (n) to also carry out transaction processing with respect to a message with the status [not processed] among the messages with the trade category [n].

Example of a Status Change in Table 110

Next, an example is explained in the case when transaction processing carried out with respect to a message with the trader name [B] in the table shown in FIG. 2, fails. An example of a changed in status in the table 110 is explained in the case where the cause for this failure is that the trader name [B] is an error message and in the case where the process (9) is an error process.

FIG. 6 is a diagram for explaining a table 110 before transaction processing in the process (9) in the first embodiment of the present invention. At this time, transactions with respect to the trader names [A], [D] are completed and the status changes from [not processed] to [completed normally]. Here, it is assumed that the process (9) carries out transaction processing with respect to a message (trade name [B]) with the trade category (9) and the status (not processed) and this process fails.

FIG. 7 is a diagram for explaining the table 110 in the case where transaction processing of the process (9) fails in the first embodiment of the present invention. As the result of transaction processing by the process (9) failing, the status corresponding to the trader name [B] changes from [not processed] to [warning completion] as is shown in FIG. 7. At this time, it is unclear where the cause of the failure is an error in the message or an error in the process. In the present embodiment, the backup process (9) carries out transaction processing with respect to the trader name [B].

FIG. 8 is a diagram for explaining the table 110 in the case where transaction processing of the backup process (9) fails in the first embodiment of the present invention. When transaction processing carried out in the backup process (9) fails, as is shown in FIG. 8, a status corresponding to the trader name [B] changes from [warning completion] to [error]. In this case, the error process part 123 judges that the message of the trader name [B] is an error message.

Furthermore, even when the process (9) carries out transaction processing of the backup process (9), transaction processing with respect to a different message is carried out. Therefore, the process (9) carries out transaction processing with respect to a trader name [C] with the trade category [9] and the status [not processed]. As described above, since there is no error in the process (9), transaction processing carried out by the process (9) with respect to the trader name [C] is successful and the status changed from [not processed] to [completed normally].

FIG. 9 is a diagram for explaining the table 110 in the case where transaction processing of the backup process (9) is successful in the first embodiment of the present invention. When transaction processing carried out in the backup process (9) is successful, as is shown in FIG. 9, a status corresponding to the trader name [B] changes from [warning completion] to [completed normally]. In this case, there is no failure is the message of the trader name [B] and the error process part 123 judges that the process (9) an error process. As a result, the process (9) is terminated by the error process part 123.

Furthermore, the process (9) sometimes carries out in error transaction processing with respect to the trader name [C] with the trade category [9] and the status [not processed] before the process (9) is terminated by the error process part 123. In this case, because the transaction processing carried out with respect to the trader name [C] by the process (9) which is an error process ends in failure, the status changes from [not processed] to [warning completion].

FIG. 10 is a diagram for explaining a table 110 after transaction processing in the backup process (9) continuing from FIG. 9. Because transaction processing with respect to the trader name [C] by the process (9) fails and the status changes to [warning completion], the backup process (9) carries out the transaction processing with respect to the trader name [C] again. In addition, the status of the trader name [C] changes from [warning completion] to [completed normally]. After the process (9) is terminated by the error process part 123, the backup process (9) carries out transaction processing with respect to the message of the trade category [9] even if the status is [not processed].

In this way, in the case where transaction processing carried out with respect to a message by the process (n) fails, the data processing system 1 in the first embodiment of the present invention can judge whether this message is an error message or whether the process (n) is an error process. Consequently, because it is possible to easily isolate the cause of a transaction processing failure, it is possible to quickly restore the system. In addition, because it is possible for transaction processing to be carried out by the backup process (9) even in the case where the process (n) is an error process, it is possible to reduce stalling of transaction processing with respect to a message. In addition, although the process structure contains redundancy when the data processing system is comprised of a process and backup process, it is still possible to easily isolate the cause of a transaction processing failure.

Second Embodiment

Each process in process part 121 in the first embodiment could carry out one type of allocated transaction processing respectively. However, the second embodiment is formed so that a plurality of types of transaction processing can be carried out respectively by each process in process part 121A. Although there are many methods in which it is possible to carry out a plurality of types of transaction processing by one process in process part 121A such as stacking processes for example, the data processing system may also be formed from a plurality of modules which carry out a plurality of transaction processing.

Figure 11:
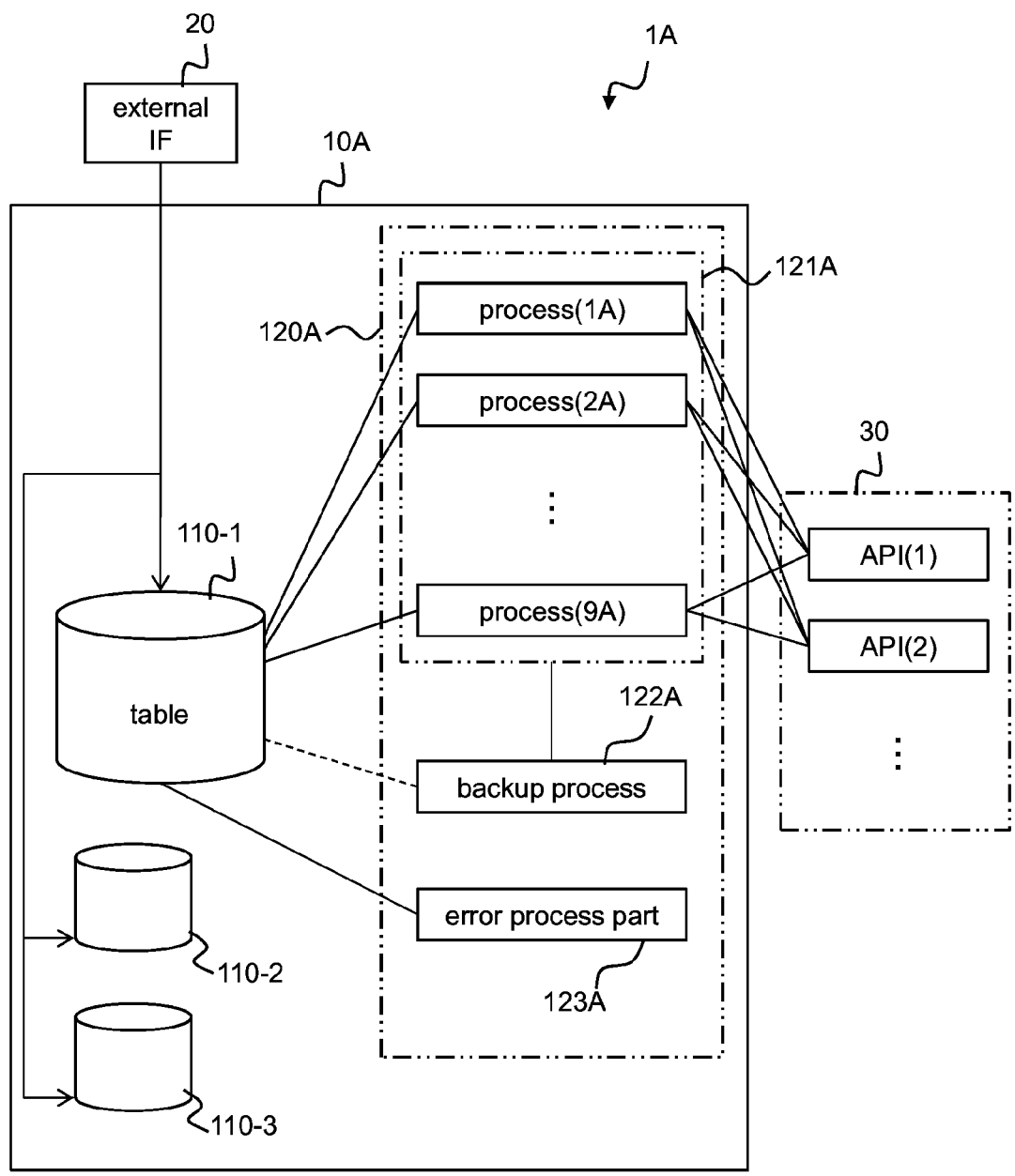
FIG. 11 is a diagram for explaining a data processing system in a second embodiment of the present invention.

FIG. 11 is a diagram for explaining a data processing system 1A in the second embodiment of the present invention. The data processing system 1A is formed by replacing the data processing device 10 in the first embodiment with the data processing device 10A. The same structure as that in the first embodiment is described using the same reference symbols and an explanation of that structure is omitted below.

A CPU 120A of the data processing device 10A is realized by each function of a process part 121A, backup process 122A and error process part 123A. The process part 121A is comprised of nine processes in this example. Unlike the case in the first embodiment, each of these nine processes can carry out transaction processing of any one trade category [1]~[9], In the explanation below, the nine processes are called process (1A), process (2A), . . . process (9A). Furthermore, although each process is named differently, there is no difference in their functions so that it is possible to carry out each type of transaction processing. Therefore, each process is described as process (A) in the case where each of the nine processes is not distinguished. Furthermore, even though there is no difference in function, different process algorithms may be included for realizing a function within the processes.

Transaction processing is carried out with respect to a message with a trade category [n] in process (n) in the first embodiment. However, the second embodiment is different in the point that the process (A) can carry out transaction processing with respect to a message of any trade category. That is, process (A) carries out transaction processing of a trade category corresponding to a message with the status [not processed] by referring to table 110.

The backup process 122A does not carry out transaction processing unlike the case in the first embodiment but carries out transaction processing in the backup process (n) in the first embodiment in any one of the processes in process (A). Alternatively, backup process (n) may include one or all of the functions of process (A) and may carry out transaction processing with respect to a message with the status [warning completion]. The error process part 123A carries out the same processes as the error process part 123 in the first embodiment. Therefore, an explanation of the error process part 123A is omitted here.

Figure 12:
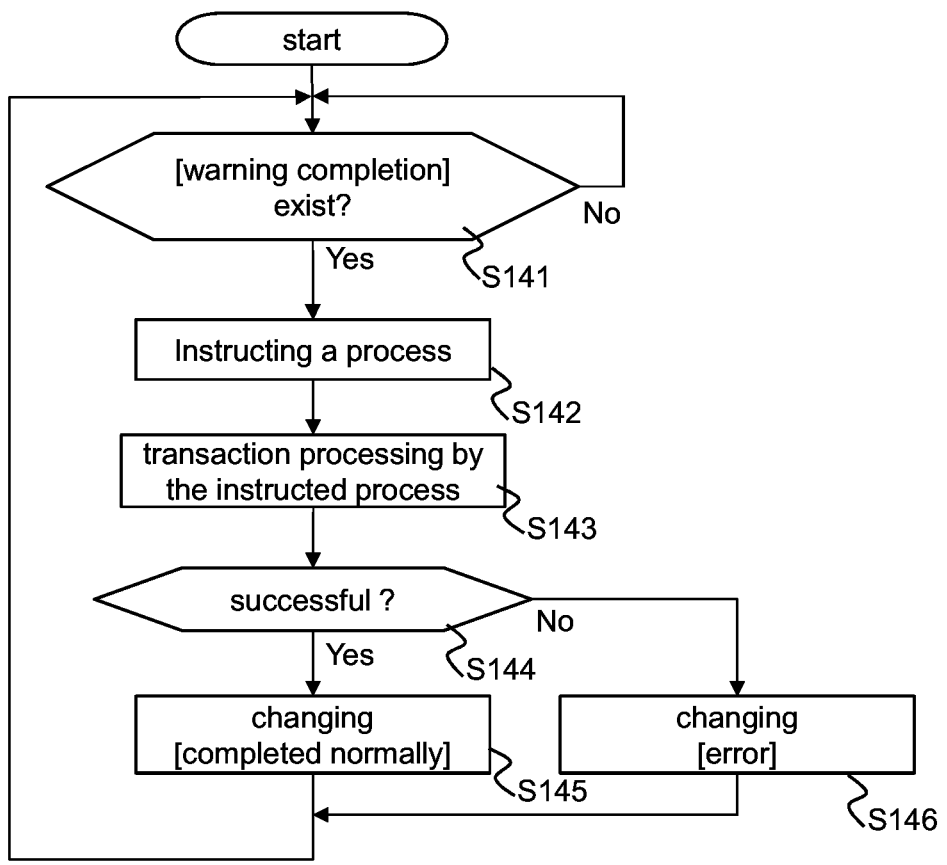
FIG. 12 is a flowchart for explaining a backup process in the second embodiment of the present invention.

FIG. 12 is a flowchart for explaining the backup process part 122A in the second embodiment of the present invention. The backup process part 122A judges whether there is a message with the status [warning completion] by referring to the table 110 (step S141). In the case where there is no [warning completion] status (step S141: No), the backup process 122A waits until the process (A) changes the status.

In the case where a message exists with the status [warning completion] (step S141: Yes), the backup process 122A specifies a process (A) to carry out transaction processing with respect to that message (step S142). Here, the backup process 122A specifies a process (A) other than the process (A) which changes the status to [warning completion]. It is possible to register which process (A) changes the status to [warning completion] in the table 110 at the time of changing a status or the backup process 122A may continue to observe status changes in the table 110 by the process (A).

Next, the backup process 122A instructs the process (A) specified in the process in step S142 to carry out transaction processing with respect to a message in which the status is changed to [warning completion] (step S143). In this way, the instructed process (A) carries out the transaction processing according to the instruction.

The backup process 122A observes the transaction processing carried out by the instructed process (A) and judges whether it was successful or a failure (step S144). In the case where the transaction processing carried out by the instructed process (A) is successful (step S144: Yes), the backup process 122A changes the status corresponding to the message which is the object of the transaction processing from [warning completion] to [completed normally] (step S145) and the process returns to step S141. In the case where the transaction processing carried out by the instructed process (A) is a failure (step S144: No), the backup process 122A changes the status corresponding to the read message from [warning completion] to [error] (step S146) and the process returns to step S141.

In this way, in the case where there are a plurality of processes (A) which carry out a plurality of types of transaction processing in the process part 121A, the backup process 122A does not carry out transaction processing and can carry out transaction processing (A) other than the process (A) in which the status is changed to [warning completion].

Third Embodiment

The trade categories were divided into [1]~[9] in the second embodiment. However, the case where there is only one trade category is explained in the third embodiment.

Figure 13:
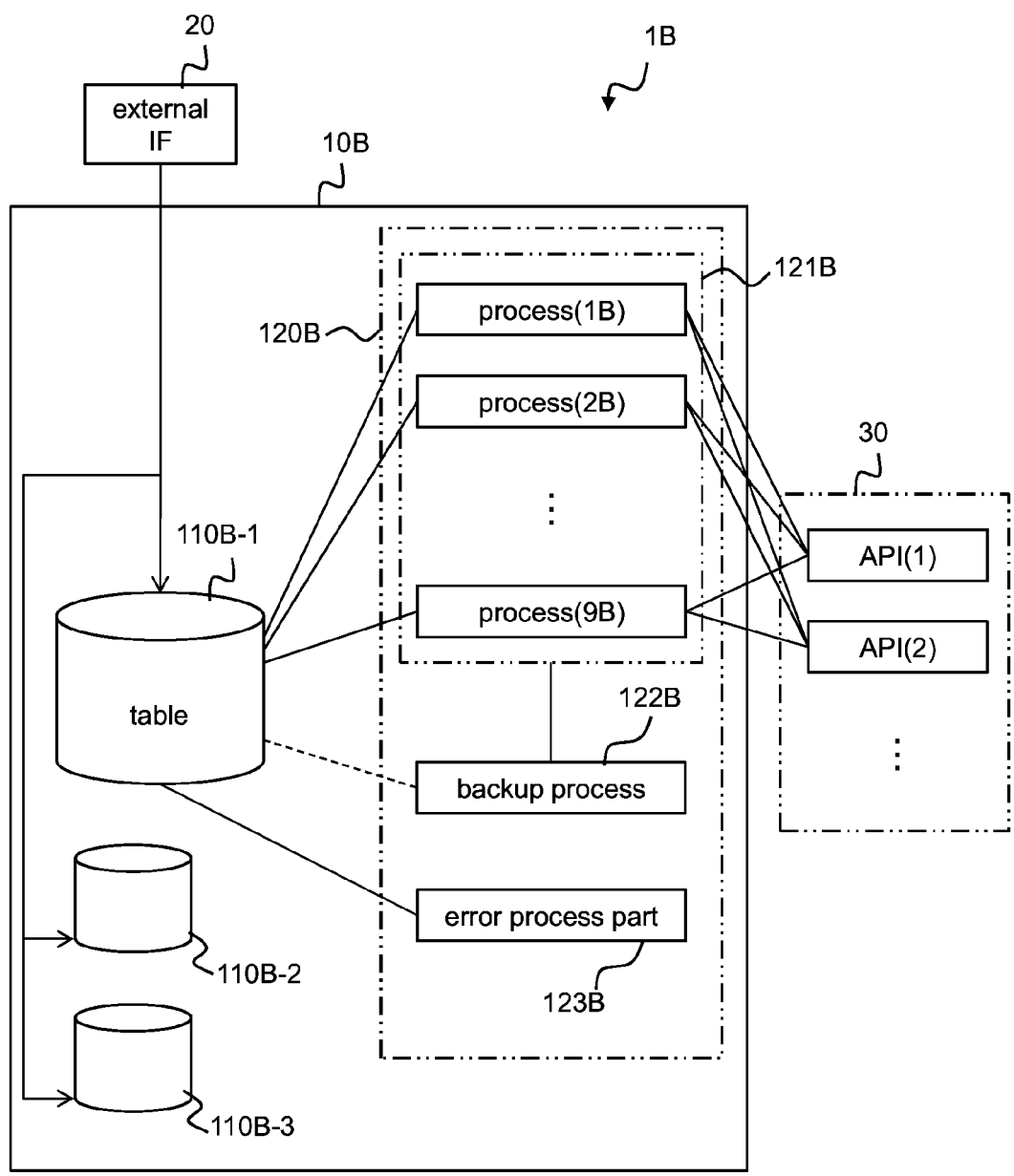
FIG. 13 is a diagram for explaining data processing system in a third embodiment of the present invention.

FIG. 13 is a diagram for explaining a data processing system 1B in the third embodiment of the present invention. The data processing system 1B is formed by replacing the data processing device 10A in the first embodiment with the data processing device 10B. The same structure as that in the first and second embodiments is described using the same reference symbols and an explanation of that structure is omitted below.

FIG. 14 is a diagram for explaining a table 110B in the third embodiment of the present invention. In the third embodiment, there is one trade category determined in advance. Therefore, in the table 110B (110B-1, 110B-2, 110B-3) in the data processing device 10B trade categories are not correlated but trader name and status are correlated.

A CPU 120B of the data processing device 10B is realized by each function of a process part 121B, backup process 122B and error process part 123B. The process part 121B is comprised of nine processes in this example. Unlike the case in the second embodiment, each of these nine processes carries out transaction processing of a trade category determined in advance. In the explanation below, the nine processes are called process (1B), process (2B), . . . process (9B). Furthermore, although each process is named differently, there is no difference in their functions so that it is possible to carry out each type of transaction processing. Therefore, each process is described as process (B) in the case where each of the nine processes is not distinguished.

The process (B) carries out transaction processing corresponding to a message with the status [not processed] by referring to the table 110B the same as the process (A) in the second embodiment. However, unlike the second embodiment, because there is only one trade category which is determined in advance, the process (B) carries out the same transaction processing with respect to each message. The backup process 122B carries out the same process as the backup process 122A in the second embodiment. In addition, the error process part 123B carries out the same process as the error process part in the first embodiment. Therefore, an explanation of the backup process 122B and error process part 123B is omitted.

In the third embodiment, in the case where there is only one trade category which is determined in advance it is not necessary to correlate trade categories as in the table 110B and in addition it is possible to use the process (B) which carries out the same type of transaction processing as in the process part 121B. In addition, the backup process 122B does not carry out transaction processing the same as in the second embodiment but can carry out transaction processing in the process (B) other than the process (B) in which the status is changed to [warning completion]

MODIFIED EXAMPLES

While the embodiments and example of the present invention are explained above, the present invention can also be realized using various forms as explained below.

Modified Example 1

In the second embodiment described above, in the case where the backup process 122A instructs one process (A) to carry out transaction processing with respect to a message with the status [warning completion], the backup process 122A may instruct the process (A) to carry out transaction processing a plurality of predetermined times until the status becomes [completed normally] or the backup process 122A may instruct a plurality of processes (A). In this case, if transaction processing fails every time the transaction processing is carried out or in all the processes (A), the backup process 122A changes the status from [warning completion] to [error].

Figure 15:
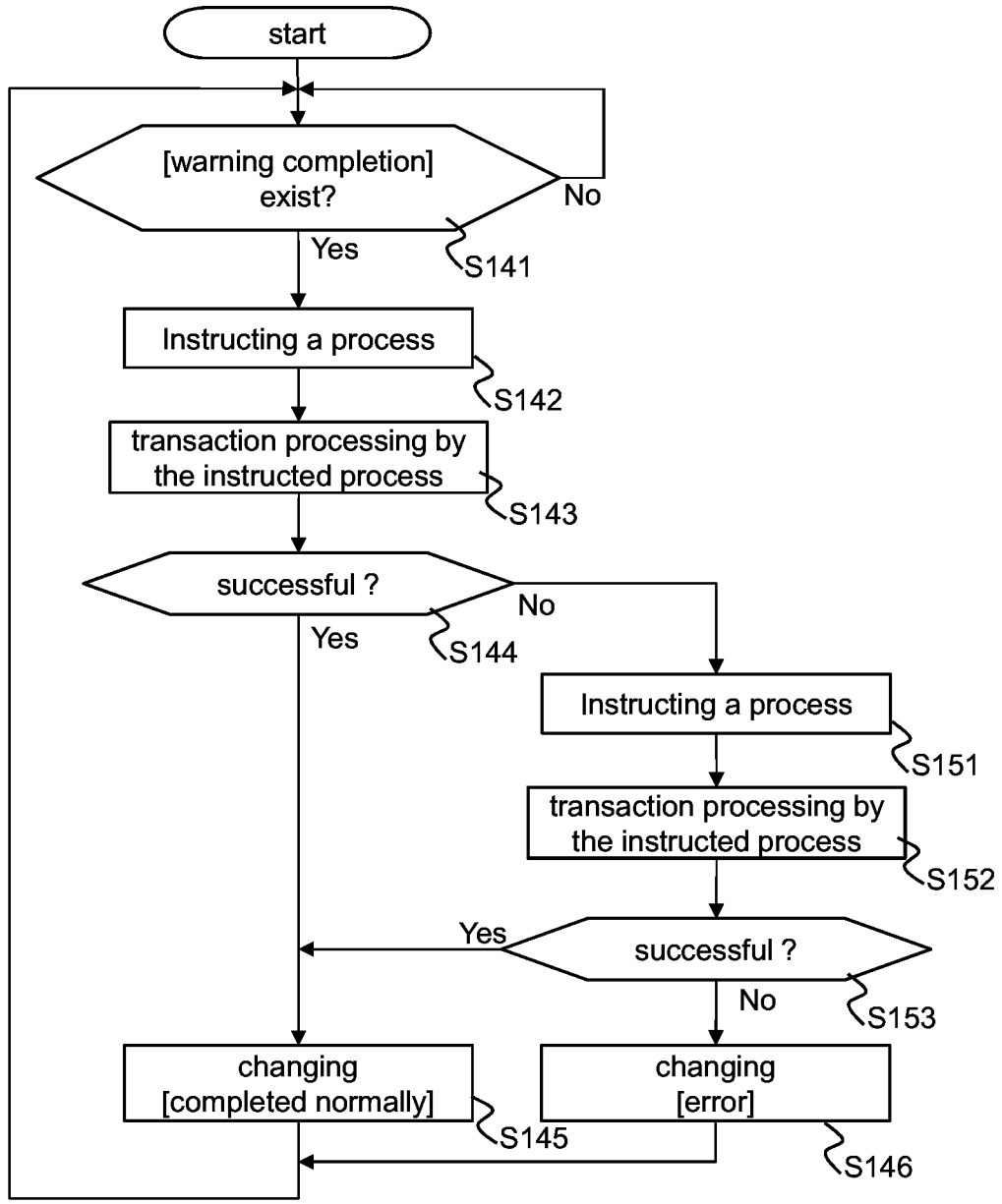
FIG. 15 is a flowchart which explains a backup process in a first modified example of the present invention.

FIG. 15 is a flowchart for explaining the backup process 122A in modified example 1 of the present invention. The same processes as in the second embodiment are described using the same reference symbols as the flowchart shown in FIG. 12. Furthermore, an explanation of steps S141~S143 is omitted.

The backup process 122A observes the transaction processing carried out by the instructed process (A) and judges whether it was successful or a failure (step S144). In the case where the transaction processing carried out by the instructed process (A) is successful (step S144: Yes), the backup process 122A changes the status corresponding to the message which is the object of the transaction processing from [warning completion] to [completed normally] (step S145) and the process returns to step S141.

In the case where the transaction processing carried out by the instructed process (A) is a failure (step S144: No), the backup process 122A specifies a process (A) other than the process (A) in which the status is changed to [warning completion] and the previously instructed process (A) (step S151). The backup process 122A instructs the process (A) specified in step S151 to carry out the transaction processing with respect to the message in which the status was changed to [warning completion] (step S152). In this way, the instructed process (A) carries out the transaction processing based on the instruction.

The backup process 122A observes the transaction processing carried out by the process (A) instructed in step S152 and judges whether it was successful or a failure (step S153). In the case where the transaction processing carried out by the instructed process (A) is successful (step S153: Yes), the backup process 122A changes the status corresponding to the message which is the object of the transaction processing from [warning completion] to [completed normally] (step S145) and the process returns to step S141. In the case where the transaction processing carried out by the instructed process (A) is a failure (step S153: No), the backup process 122A changes the status corresponding to the read message from [warning completion] to [error] (step S146) and the process returns to step S141.

In this way, because the status changes to [error] in the case where transaction processing with respect to a message which is carried out twice by process (A) or carried out by two processes (A) is a failure in modified example 1, the message is judged to be an error message by the error process part 123A. Suppose the case where the process (A) specified in step S142 is an error process and there are no errors in the message. In this case, although the error process part 123A wrongly judges that the message is an error message in the second embodiment, in the modified example 1 the message is no longer judged as an error message. That is, by carrying out transaction processing a plurality of times or by a plurality of processes (A) in the modified example 1, it is possible to reduce the possibility of the error process part 123A wrongly judging a message with no error as an error message.

Furthermore, in the explanation above, the backup process 122A instructs two processes (A) to carry out transaction processing in sequence. However, the backup process 122A may also instruct more than two processes (A) to carry out transaction processing. In this case, the status may be changed to [error] when transaction processing fails in all of the instructed processes (A).

In addition, the backup process 122A instructs a different process (A) to carry out transaction processing after transaction processing carried out in the process (A) which was instructed first ends in a failure. However, the backup process 122A may also specify and instruct a plurality of processes (A) to carry out transaction processing together. In this case, the status may change to [error] when the transaction processing carried out by all the instructed processes (A) fail, and the status may be changed to [completed normally] when transaction processing by any one of the processes (A) is successful.

In addition, the error process part 123A not only judges that a process (A) in which the status of a message is changed to [warning completion] in step S134 shown in FIG. 5 but may also judge whether a process (A) in which transaction processing fails among processes (A) instructed by the backup process 122A is an error process or not. In addition, the error process part 123A may terminate all the processes (A) judged to be error processes in step S135.

Furthermore, while the structure of the modified example 1 was explained as a modified example of the second embodiment, it is also possible to use a modified example of the third embodiment. In addition, it is also possible to apply the structure of the modified example 1 to the first embodiment. In this case, a plurality of backup processes (n) may be arranged and the status may be changed to [error] in the case where all the transaction processing in each backup process (n) fails.

Modified Example 2

While the number of processes was nine in the first, second and third embodiments described above, the number of processes may be more or less than nine and may also be one. In addition, in the first embodiment, a plurality of processes (n) which carry out the same type of transaction processing may be arranged. In this case, because it is possible to carry out transaction processing in a another process (n) even if a process (n) judged to be an error process is terminated, it is not necessary for a process to be carried out instead of the process (n) terminated by the backup process (n).

In addition, in the second embodiment, a structure in which it is possible for each process (A) to carry out transaction processing in all trade categories is not necessary. For example, a structure in which it is possible for a process (1A) to carry out transaction processing in trade categories [1]~[4] and a structure in which it is possible for a process (2A) to carry out transaction processing in trade categories [3]~[8] are also possible. At this time, transaction processing of a trade category included in many process requests among trade categories may be weighted and allocated so that it can be carried out by many processes (A). For example, in the case where there are many process request of a trade category [1] and there few process requests of a trade category [9], the transaction processing of the trade category [1] can be carried out by the processes (1A)~(8A) and the transaction processing of the trade category [9] can be carried out by the processes (7A)~(9A).

Modified Example 3

In the second embodiment described above, the backup process 122A does not carry out transaction processing using its own process but carries out transaction processing in the process (A). However, the backup process 122A may also carry out transaction processing using its own process. In this case, the backup process 122A may also be the object other than process (A) as an object of the process specified by the backup process 122A in step S142 shown in FIG. 12. Furthermore, it is possible to apply the structure of the modified example 3 to the third embodiment.

Modified Example 4

In the first and second embodiments described above, a trader name which includes the contents of a message, a trade category which shows the type of transaction processing and a status which shows the status of a message process are correlated by the table 110. However each of these data may be correlated by a plurality of tables. In this example, the case is explained where each of these data are correlated by two tables.

FIG. 16 is a diagram for explaining a table in a modified example 4 of the present invention. FIG. 16 (*a*), (*b*) show an example where each data is correlated by a table 110 of the first embodiment and an example where each data is correlated by a plurality of tables. In the table in FIG. 16 (*a*) a message identifier [ZA, ZB, . . . ], trading contents, and a trading category are correlated. In the table in FIG. 16 (*b*) a message identifier and status are correlated. A message identifier is determined in order to correlate the data of the table in FIG. 16 (*a*) and the data of the table in FIG. 16 (*b*). The message identifier for example may be allocated by the CPU 120 each time a process request from the external interface 120 is received.

In the case where these two tables are used, for example when process (1) carries out transaction processing with respect to a message correlated with a message identifier ZA by referring to the table in FIG. 16 (*a*), the status correlated with the message identifier ZA by the table in FIG. 16 (*a*) changes. In this way, in the modified example 4, the table 110 of the first embodiment is divided into a table (FIG. 16 (*a*)) rewritten according to a process request from the external interface 20, and a table (FIG. 16 (*b*)) rewritten according to a process in the process part 121 and the backup process part 122. Furthermore, it is possible to determine various ways in which each correlated data is correlated by any of a plurality of tables. In addition, it is possible to apply the structure of the modified example 4 to the third embodiment which does not use a trade category.

What is claimed is:

1. A data processing device comprising:
at least one memory, wherein the at least one memory contains a table configured to correlate a message, a type of transaction processing to be processed with respect to the message, and a process status of the message;
a first process configured to:
carry out the transaction processing associated with the message when the process status is not-processed state, and
change the process status to a first state in a case where the transaction processing is successful and change the process status to a second state in a case where the transaction processing fails;
a backup process configured to:
carry out the transaction processing associated with the message having the process status is in the second state, and
change the process status to the first state in a case where the transaction processing is successful and change the process status to a third state in a case where the transaction processing fails; and
an error handling process configured to:
determine, when the backup process carries out the transaction processing and the process status is changed to the first state by the backup process, that the first process carrying out the failed transaction processing is an error process, and
determine, when the backup process carries out the transaction processing and the process status is changed to the third state by the backup process, that the message associating with the failed transaction processing is an error message.

2. The data processing device according to claim 1, wherein the error handling process is further configured to terminate the first process determine to be the error process and instruct the backup process to carry out the transaction processing associated with the message to be subject to the transaction processing carried out by the first process.

3. The data processing device according to claim 1, wherein the backup process is further configured to change the process status to the third state as a failure of the transaction processing in a case where the transaction processing is not successful after being carried out a plurality of times.

4. The data processing device according to claim 1, wherein the at least one memory contains a plurality of the tables.

5. A data processing device comprising:
at least one memory, wherein the at least one memory contains a table configured to correlate a message, a type of transaction processing to be processed with respect to the message, and a process status of the message;
a first process configured to:
carry out the transaction processing associated with the message when the process status is a not-processed state, and
change the process status to a first state in a case where the transaction processing is successful and change the process status to a second state in a case where the transaction processing fails;
a backup process configured to:
instruct the first process to carry out the transaction processing associated with the message having the process status changed to the second state by the first process,
change the process status to the first state in a case where the transaction processing is successful and change the process status to a third state in a case where the transaction processing fails; and
an error handling process configured to:
determine, when the backup process instructs the first process to carry out the transaction processing and the process status is changed to the first state by the backup process, that the first process carrying out the failed transaction processing is an error process, and
determine, when the backup process instructs the first process to carry out the transaction processing and the process status is changed to the third state by the backup process, that the message associating with the failed transaction processing is an error message.

6. The data processing device according to claim 5, wherein the error handling process is further configured to terminate the first process determine to be the error process.

7. The data processing device according to claim 5, wherein the backup process is further configured to:
instruct a plurality of the first processes to carry out the transaction processing, and
change the process status to the third state in a case where the transaction processing carried out in all the first processes fail.

8. The data processing device according to claim 7, wherein the backup process is further configured to the process status to the first state in a case where the transaction processing carried out by any one of the first processes to carry out the transaction processing is successful, and the error handling process is further configured to determine, when the backup process instructs the plurality of the first processes to carry out the transaction processing and the process status is changed to the first state, that the first process, among the plurality of the first processes, carrying out the failed transaction processing as an error process.

9. The data processing device according to claim 5, wherein the at least one memory contains a plurality of the tables.

10. A data processing device comprising:

at least one memory, wherein the at least one memory contains a table configured to correlate a message and process status corresponding to the message;

a first process configured to:

carry out the transaction processing associated with the message when the process status is a non-processed state, and change the process status to a first state in a case where the transaction processing is successful and change the process status to a second state in a case where the transaction processing fails;

a backup process configured to:

instruct the first process to carry out the transaction processing associated with the message having the process status changed to the second state, and change the process status to the first state in a case where the transaction processing is successful and change the process status to a third state in a case where the transaction processing fails; and an error handling process configured to:

determine, when the backup process instructs the first process to carry out the transaction processing and the process status is changed to the first state by the backup process, that the first process carrying out the failed transaction processing is an error process, and determine, when the backup process instructs the first process to carry out the transaction processing and the process status is changed to the third state by the backup process, that the massage associated with the failed transaction processing is an error message.

11. The data processing device according to claim 10, wherein the error handling process is further configured to terminate the first process determine to be the error process.

12. The data processing device according to claim 10, wherein the backup process is further configured to:

instruct a plurality of the first processes to carry out the transaction processing and change the process status to the third state in a case where the transaction processing carried out in all the first processes fail.

13. The data processing device according to claim 12, wherein the backup process further configured to change the process status to the first state in a case where the transaction processing carried out by any one of the first processes instructed to carry out the transaction processing is successful, and the error handling process is further configured to determine, when the backup process instructs the plurality of the first processes to carry out the transaction processing and the process status is changed to the first state, that the first process, among the plurality of the first processes, carrying out the failed transaction processing as an error process.

14. The data processing device according to claim 10, wherein the at least one memory contains a plurality of the tables.

* * * * *